(12) United States Patent
Li

(10) Patent No.: US 9,843,708 B2
(45) Date of Patent: Dec. 12, 2017

(54) PULL-ROD TYPE DIGITAL CAMERA

(71) Applicant: WINNERS' SUN PLASTIC & ELECTRONIC (SHENZHEN) CO. LTD, Shenzhen, Guangdong (CN)

(72) Inventor: Zhengliang Li, Shanghai (CN)

(73) Assignee: WINNERS'SUN PLASTIC & ELECTRONIC (SHENZHEN) CO., LTD, Shenzhen (CN)

( * ) Notice: Subject to any disclaimer, the term of this patent is extended or adjusted under 35 U.S.C. 154(b) by 0 days.

(21) Appl. No.: 15/157,438

(22) Filed: May 18, 2016

(65) Prior Publication Data
US 2016/0261782 A1    Sep. 8, 2016

Related U.S. Application Data

(63) Continuation-in-part of application No. PCT/CN2015/070758, filed on Jan. 15, 2015.

(30) Foreign Application Priority Data

Sep. 29, 2014    (CN) ..................... 2014 2 0568546 U

(51) Int. Cl.
*H04N 5/232*    (2006.01)
*H04N 5/225*    (2006.01)
(Continued)

(52) U.S. Cl.
CPC ............ *H04N 5/232* (2013.01); *F16M 11/06* (2013.01); *F16M 11/28* (2013.01); *F16M 13/04* (2013.01);
(Continued)

(58) Field of Classification Search
CPC .... H04N 5/232; H04N 5/2251; G03B 17/563; G03B 17/561; F16M 11/28; F16M 13/04; F16M 11/06; F16M 11/26
See application file for complete search history.

(56) References Cited

U.S. PATENT DOCUMENTS

| 6,369,849 B1* | 4/2002 | Rzyski | G02B 23/08 |
| | | | 348/158 |
| 2009/0003822 A1* | 1/2009 | Tyner | F16M 11/32 |
| | | | 396/428 |

(Continued)

FOREIGN PATENT DOCUMENTS

| CN | 102761696 A | 10/2012 |
| CN | 203537442 U | 4/2014 |
| CN | 203761442 U | 8/2014 |

OTHER PUBLICATIONS

Lance Lab, "Operating Manual: TC 7," internet web page downloaded from https://www.lancelab.com/wp-content/uploads/2015/06/TC7_Operating_Manual_A5_Master-14.11.14.pdf, dated 2014.*

(Continued)

*Primary Examiner* — Dennis Hogue

(57) ABSTRACT

This patent application relates to a digital camera field, in particular, to a kind of pull-rod type digital camera. The pull-rod type digital camera includes a shooting assembly and a control assembly. The shooting assembly includes a camera, and the digital camera further includes a telescopic rod. One end of the telescopic rod is arranged movably inside the control assembly, and the other end is rotationally connected with the shooting assembly, through which the shooting assembly can be separated from the control assembly to a certain distance when stretching the telescopic rod, and it is convenient to take a selfie and carry out other operations by rotating the shooting assembly to a proper position.

5 Claims, 2 Drawing Sheets

(51) Int. Cl.
    *G03B 17/56*     (2006.01)
    *F16M 11/28*     (2006.01)
    *F16M 11/06*     (2006.01)
    *F16M 13/04*     (2006.01)

(52) U.S. Cl.
    CPC ......... *G03B 17/563* (2013.01); *H04N 5/2251* (2013.01)

(56) References Cited

U.S. PATENT DOCUMENTS

| | | | |
|---|---|---|---|
| 2009/0315671 A1* | 12/2009 | Gocho | G03B 17/38 340/5.8 |
| 2012/0242823 A1* | 9/2012 | Schwartz | H04N 7/183 348/82 |
| 2013/0176412 A1 | 7/2013 | Chen | |

OTHER PUBLICATIONS

Netsatisfaction, "Telescopic Pole Video Camera Under Vehicle Inspection IED Hidden Bomb Detection," Ebay auction downloaded from http://www.ebay.com/itm/Telescopic-Pole-Video-Camera-Under-Vehicle-Inspection-IED-Hidden-Bomb-Detection-/160718025581, auction ended Jun. 3, 2015.*

International Search Report of PCT Patent Application No. PCT/CN2015/070758 issued on Jul. 7, 2015.

Patent Evaluation Report of counterpart Chinese Utility Model Application No. 201420568546.2 completed on Apr. 16, 015.

\* cited by examiner

PULL-ROD TYPE DIGITAL CAMERA

CROSS-REFERENCE TO RELATED APPLICATIONS

The present application is a Continuation-In-Part Application of PCT application No. PCT/CN2015/070758 filed on Jan. 15, 2015, which claims the benefit of Chinese Patent Application No. 201420568546.2 filed on Sep. 29, 2014, the contents of which are hereby incorporated by reference.

FIELD OF THE INVENTION

The patent application relates to a digital camera field, and particularly, to a pull-rod type digital camera.

BACKGROUND

The camera of existing digital cameras is generally fixed on the camera body. It is very inconvenient when used in some special occasions such as news interview, taking a selfie. For example, it is necessary to use a tripod or other auxiliary equipments when taking a selfie, or ask someone to help photograph, which makes users feel very inconvenient.

Therefore, it is urgent to provide a kind of digital camera convenient for use when taking a selfie or news interview, etc.

SUMMARY

To overcome the drawbacks of the prior art, the object of the patent application is to provide a pull-rod type digital camera, to overcome the drawbacks that it is very inconvenient to use the existing digital camera in some special occasions such as news interview, taking a selfie, etc.

The technical solution used for solving the technical problem is providing a pull-rod type digital camera. The pull-rod type digital camera comprises a shooting assembly and a control assembly. The shooting assembly comprises a camera. The digital camera further comprises a telescopic rod. One end of the telescopic rod is arranged movably inside the control assembly, and the other end of the telescopic rod is rotationally connected with the shooting assembly.

Optional, the control assembly comprises a control handle and a display, and the display is rotationally connected with the control handle.

Optional, the control handle is provided with a universal ball, and the display is connected with the control handle by rotating the universal ball.

Optional, the control handle is provided with several function keys which at least comprise a power key, a shutter key, a focusing key and a menu key.

Optional, the control handle is provided with a memory card slot.

Optional, the control handle is also provided with a USB interface.

Optional, the telescopic rod comprises several telescopic joints, and a top telescopic joint is rotationally connected with the shooting assembly, a bottom telescopic joint is movably arranged inside the control handle.

Optional, the top telescopic joint is a little longer than the control handle, and other telescopic joints match with the control handle in length.

Optional, the top telescopic joint is connected with the shooting assembly by a hinge.

Optional, the digital camera further comprises a microphone arranged on the shooting assembly.

The patent application can achieve the following beneficial effects: through arranging the one end of the telescopic rod inside the control assembly movably, and rotationally connecting the other end with the shooting assembly, the shooting assembly can be separated from the control assembly to a certain distance when stretching the telescopic rod, and it will be convenient to take a selfie and carry out other operations by rotating the shooting assembly to a proper position.

BRIEF DESCRIPTION OF THE DRAWINGS

The patent application is further described in combinations with the attached drawings and the embodiments.

DETAILED DESCRIPTION

Preferable embodiments in the patent application are described in details in combination with the attached drawings.

Figure 1:
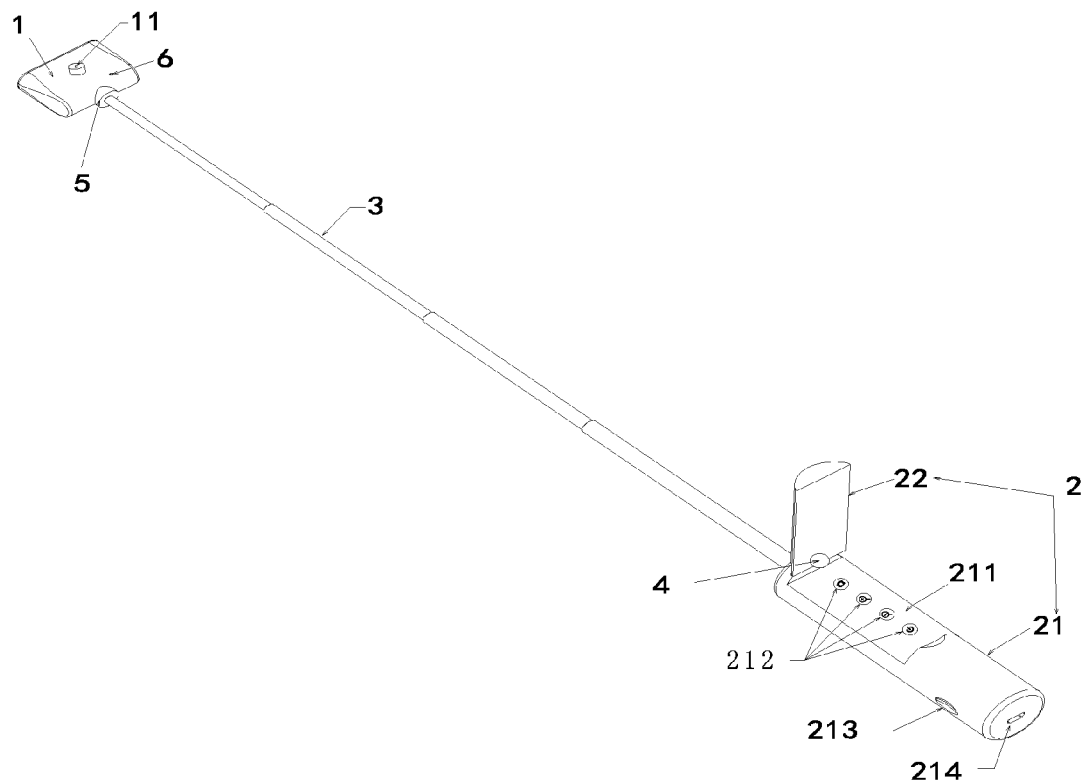
FIG. 1 is a perspective view of the pull-rod type digital camera which is in the use state according to the patent application.

Referring to FIG. 1, the pull-rod type digital camera in the embodiment includes a shooting assembly 1 and a control assembly 2. The shooting assembly 1 includes a camera 11, and the digital camera further includes a telescopic rod 3. One end of the telescopic rod 3 is movably arranged inside the control assembly 2, and the other end is rotationally connected with the shooting assembly 1. Since one end of the telescopic rod 3 is movably arranged inside the control assembly 2, the control assembly 2 can hold the telescopic rod 3 when it is under compression, without occupying other spaces. It is convenient for carrying of the pull-rod type digital camera. The shooting assembly 1 can be separated from the control assembly 2 to a certain distance when stretching the telescopic rod 3, and it will be convenient to take a selfie and carry out other operations by rotating the shooting assembly 1 to a proper position.

Referring to FIG. 1, the control assembly 2 in the embodiment includes a control handle 21 and a display 22, and the display 22 is rotationally connected with the control handle 21. The rotary connection can be achieved through hinge, universal ball or any other rotary connection types. After the rotary connection between the display 22 and the control handle 21, it becomes easy to adjust the visual angle of the display 22 that is used to view photos and to observe if the view-finding angle of the camera is appropriate when shooting. When it is appropriate, photos can be taken through the control handle 21. When it is not appropriate, the view-finding angle can be adjusted through adjusting the control handle 21 or shooting assembly 1, and then photos can be taken.

Figure 2:
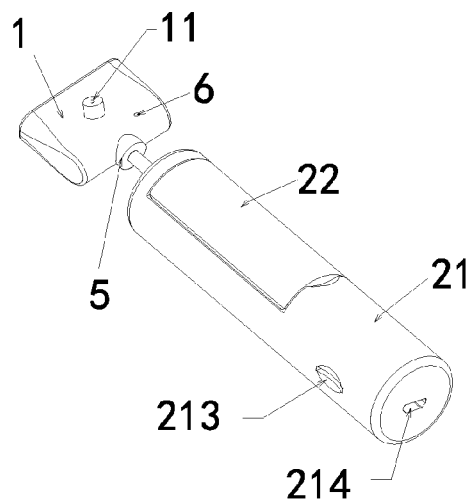
FIG. 2 is a perspective view of the pull-rod type digital camera which is the folding state according to the patent application.

Referring to FIG. 1 and FIG. 2, the control handle 21 in the embodiment is provided with a universal ball 4, and the display 22 is connected with the control handle through the universal ball 4. Further, the control handle 21 is provided with a function key 212, and the function key 212 at least include a power key, a shutter key, a focusing key and a menu key. After the display 22 is connected with the control handle 21 through the universal ball 4, the display angle of the display 22 can be adjusted randomly, so that the users can observe the view-finding angle in different occasions or when different shooting angles.

Referring to FIG. 2, the control handle 21 in the embodiment is provided with a memory card slot 213. The memory card slot 213 is used to plug in the memory card, such as SD card, CF card, etc. Further, the control handle 21 is also provided with a USB interface 214. The USB interface 214 is used for data communication with the digital camera and/or charging and other operations. The memory card slot 213 and the USB interface 214 can be arranged at any position on the control handle.

Figure 3:
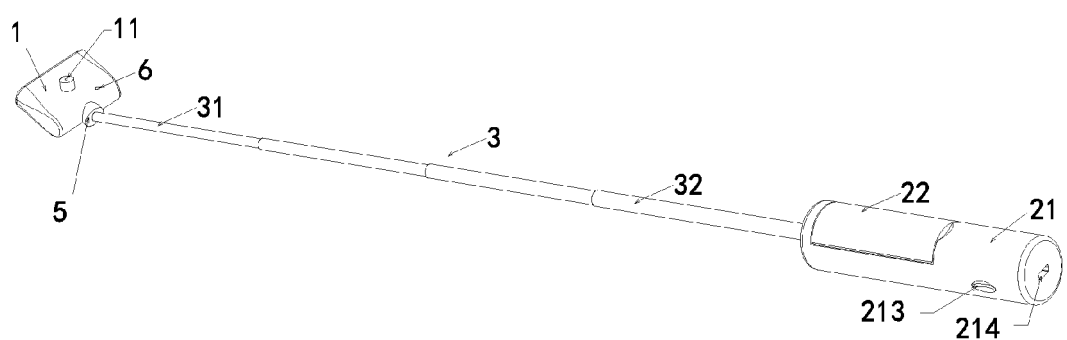
FIG. 3 is a perspective view of the pull-rod type digital camera with the telescopic rod being stretched according to the patent application.

Referring to FIG. 3, the telescopic rod 3 in the embodiment includes several telescopic joints. The top telescopic joint 31 is rotationally connected with the shooting assembly 1, the bottom telescopic joint 32 is movably arranged inside the control handle 21. The top telescopic joint 31 is a little longer than the control handle 21, which guarantees that the shooting assembly 1 will not hit against the control handle 21 when folding the telescopic rod 3; and other telescopic joints match with the control handle 21 in length, which guarantees that other telescopic joints can be folded completely in the control handle 21, thus reducing the whole volume of the digital camera. Preferably, the telescopic rod 3 is connected with the shooting assembly 1 by a hinge 5. Because each telescopic joint of the telescopic rod 3 can rotate mutually, so after the telescopic rod 3 is connected with the shooting assembly 1 by a hinge 5, the view-finding angle of the shooting assembly 1 can be adjusted randomly. Further, the digital camera further includes a microphone 6. The microphone 6, arranged on the shooting assembly 1, is used to record sound when the pull-rod type digital camera is used to shoot. Of course, in order to achieve the function of recording sound, the microphone 6 can also be arranged on the control handle 21.

It should be understood that the above embodiments are only used to describe rather than restrict the technical solutions in the patent application. The technicians skilled in the art can modify the technical solutions recorded in the above embodiments, or equally replace part of the technical features; and all these modifications and replacements shall fall within the scope of protection of the claims herein.

The invention claimed is:

1. A pull-rod type digital camera, comprising:
a shooting assembly; and
a control assembly,
wherein the shooting assembly comprises a camera; the digital camera further comprises a telescopic rod, one end of the telescopic rod is arranged movably inside the control assembly, and the other end of the telescopic rod is rotationally connected with the shooting assembly; the control assembly comprises a control handle and a display, and the display is rotationally connected with the control handle; the control handle is provided with a function key and a universal ball, the function key at least comprises a power key, a shutter key, a focusing key and a menu key, the display is connected with the control handle by rotating the universal ball, the function key is covered by the display and is shown by a rotation of the display; and
wherein the telescopic rod comprises several telescopic joints, and a top telescopic joint is rotationally connected with the shooting assembly, a bottom telescopic joint is movably arranged inside the control handle; the top telescopic joint is longer than the control handle, and other telescopic joints match with the control handle in length.

2. The digital camera according to claim 1, wherein the control handle is provided with a memory card slot.

3. The digital camera according to claim 2, wherein the control handle is also provided with a USB interface.

4. The digital camera according to claim 1, wherein the top telescopic joint is connected with the shooting assembly by a hinge.

5. The digital camera according to claim 1, wherein the digital camera further comprises a microphone arranged on the control handle.

\* \* \* \* \*